Aug. 16, 1938.    A. ZADEK    2,126,858
CHILD'S SPOON WITH WHISTLE IN HANDLE
Filed July 24, 1937
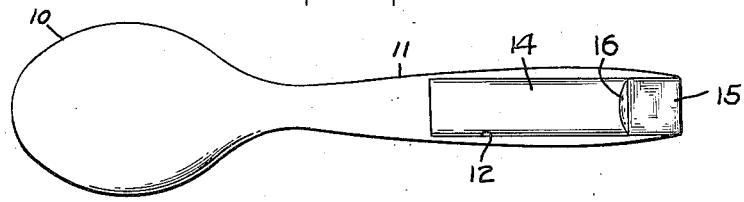
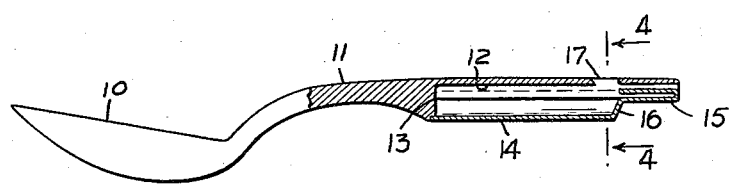
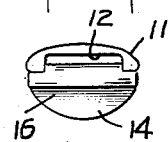    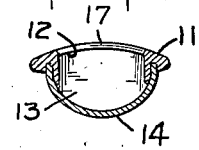
Arthur Zadek
INVENTOR
BY
his ATTORNEY Patented Aug. 16, 1938

2,126,858

UNITED STATES PATENT OFFICE 2,126,858

CHILD'S SPOON WITH WHISTLE IN HANDLE

Arthur Zadek, New York, N. Y.

Application July 24, 1937, Serial No. 155,477

2 Claims. (Cl. 46—175)

My invention relates to a child's spoon and has reference particularly to improvements in the construction of the handle portion in which a whistle is embodied.

The present invention has for its object to provide a spoon or other flat table ware with an integral handle portion having a bowl at one end and a recess along the underside of the other end to accommodate a curved plate which together with the wall of the handle itself forms a whistle, which may be easily operated by a very small child.

I accomplish this object by means of a special handle construction, one embodiment of which is illustratively exemplified in the accompanying drawing, in which, Figure 1 is an elevational plan view of the underside of a spoon showing a whistle arrangement built into the handle;

Figure 2 is a substantially longitudinal sectional view of the handle showing the bowl in side elevation;

Figure 3 is an end elevational view of the handle showing the mouthpiece of the whistle; and Figure 4 is a substantially transverse sectional view of the handle taken on lines 4—4 of Figure 2.

Referring to the drawing, 10 denotes the bowl portion of a spoon and 11 the handle portion. The handle 11 is integral at one end with the bowl 10 and rises out of the end of the latter in an easy curve and then projects fairly straight towards its outer end. The handle 11 becomes gradually wider towards its outer end and just before the end is reached it is tapered off slightly. The underside of the handle is provided with a longitudinal groove 12 which runs from the outer end to a point well towards the curved portion where it stops abruptly against a shoulder 13 forming an integral part of the underside of the handle and tapering off into a curve to join the curve of the handle.

A whistle arrangement is formed by a semi-cylindrical plate 14 depending from the underside of the handle 11 and having its parallel edges mounted adjacent the side walls of groove 12. The inner end of the plate 14 abuts the shoulder 13 and the outer end is provided with a flat tip 15 shaped out of the cylindrical portion and adapted to form the underside of the lip piece, the tip of the handle forming the upper wall. A shoulder 16 is formed in the plate 14 at the inner end of the tip 15, and disposed in the handle 11 and opening into the plate inside the shoulder 16 is a substantially transverse slot or vent 17.

In use, the child has simply to place the tip end of the handle in its mouth and blow to produce a whistling noise.

Having described my invention what I claim and desire to secure by Letters Patent is:

1. In a flat table ware piece having a handle portion cut away along one of its lateral faces to form a groove, a semi-cylindrical plate having its longitudinal edges embedded in the groove and closed at its inner end by a wall of said groove, the outer end of the plate being stepped inwardly to form a lip piece spaced slightly from the corresponding overlying portion of the handle, the latter having a slot opening into the semi-cylindrical portion of the plate to form a vent.

2. In a child's spoon having a handle portion provided with a groove in its underside terminating in a depending shoulder at its inner end, and a transverse slot short of its outer end, a semi-cylindrical plate mounted with its open side in the groove and one end abutting the said shoulder the outer end of the plate being stepped up to form a flat lip portion underlying the portion of the tip of the handle beyond the slot.

ARTHUR ZADEK.